US 6,725,459 B2

(12) United States Patent
Bacon

(10) Patent No.: US 6,725,459 B2
(45) Date of Patent: Apr. 20, 2004

(54) DESCRAMBLING DEVICE FOR USE IN A CONDITIONAL ACCESS SYSTEM

(75) Inventor: Kinney C. Bacon, Lawrenceville, GA (US)

(73) Assignee: Scientific-Atlanta, Inc., Lawrenceville, GA (US)

(*) Notice: Subject to any disclaimer, the term of this patent is extended or adjusted under 35 U.S.C. 154(b) by 644 days.

(21) Appl. No.: 09/780,544

(22) Filed: Feb. 9, 2001

(65) Prior Publication Data

US 2002/0112234 A1 Aug. 15, 2002

(51) Int. Cl.[7] .............................................. H04N 7/167
(52) U.S. Cl. ........................ 725/31; 380/241; 380/242; 380/211
(58) Field of Search ...................... 725/31, 30, 29, 725/28, 26, 27, 25; 380/210, 211, 231, 232, 233, 234, 241, 242; H04N 7/16

(56) References Cited

U.S. PATENT DOCUMENTS

| 4,264,782 | A | * | 4/1981 | Konheim ...................... 705/75 |
| 4,605,961 | A | * | 8/1986 | Frederiksen ................ 380/215 |
| 6,016,348 | A |   | 1/2000 | Blatter et al. ................... 380/5 |
| 6,105,134 | A | * | 8/2000 | Pinder et al. ............... 380/239 |

FOREIGN PATENT DOCUMENTS

| EP | 0858184 | 8/1998 |
| EP | 0893921 | 1/1999 |
| EP | 0912052 | 4/1999 |
| WO | WO 99/27712 | 6/1999 |
| WO | WO 00/04717 | 1/2000 |

* cited by examiner

Primary Examiner—Vivek Srivastava

(57) ABSTRACT

In a conditional access system, a system and method for descrambling a scrambled instance having a predetermined encryption cycle rate is claimed. The invention takes advantage of the inherent encryption period associated with a scrambled instance to control subscriber access to scrambled information.

20 Claims, 14 Drawing Sheets

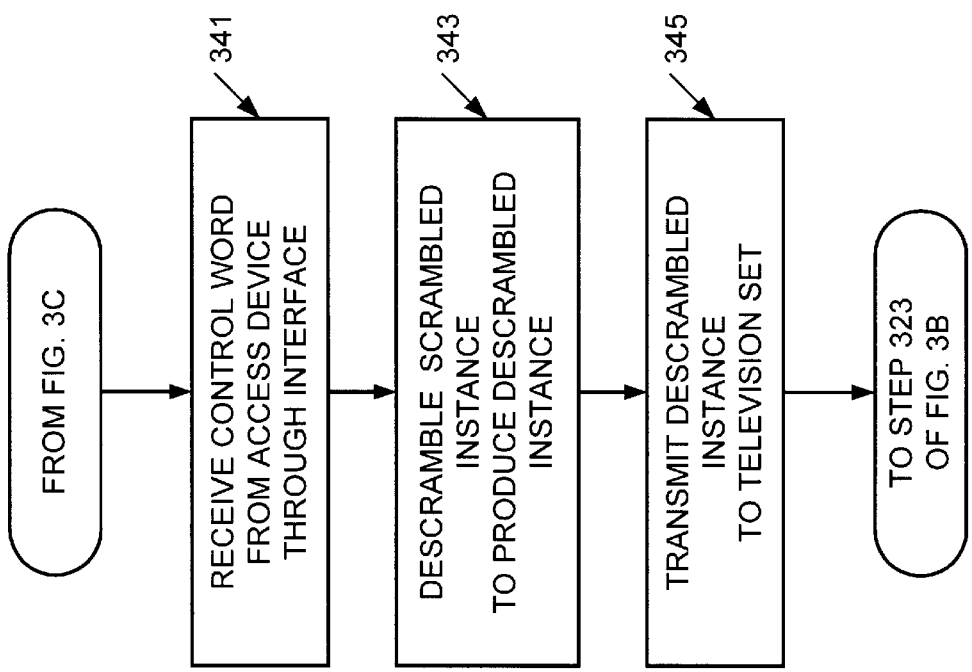

DESCRAMBLING DEVICE FOR USE IN A CONDITIONAL ACCESS SYSTEM

FIELD OF THE INVENTION

The present invention relates to systems for protecting information and more particularly relates to systems for protecting information that is transmitted by means of a wired or wireless medium against unauthorized access.

BACKGROUND OF THE INVENTION

One way of distributing information is to broadcast it, that is, to place the information on a medium from which the information can be received by any device that is connected to the medium. Television and radio are well-known broadcast media. If one wishes to make money by distributing information on a broadcast medium, there are a couple of alternatives. One alternative is to find sponsors to pay for broadcasting the information. A second is to permit access to the broadcast information only to those who have paid for it. This is generally done by broadcasting the information in scrambled form. Although any device that is connected to the medium can receive the scrambled information, only the devices of those users who have paid to have access to the information are able to descramble the information.

A service distribution organization, for example a CATV company or a satellite television company, often provides its subscribers with multiple services. Some of these services are sponsored and are transmitted in the clear. Others are paid for by the end user or subscriber and are scrambled. These services are called premium services. An example of a premium service would be a pay-per-view movie or pay-per-view sports event. These specific programs (i.e., the movie or sports event) may be broadcast to certain subscribers who wish to view, and have paid for, these programs. When the service distribution organization broadcasts a program, it scrambles the program to form a scrambled instance of the program. A scrambled instance contains instance data, which is the scrambled information making up the program.

The scrambled instance is broadcast over a transmission medium and is received at a large number of set top boxes. The function of a set top box is to determine whether the scrambled instance should be descrambled and, if so, to descramble it to produce a descrambled instance comprising the information making up the program. The program is then delivered to a television set for viewing by the subscriber.

Subscribers may purchase services on an event basis, and after a subscriber has purchased an event, the service distribution organization sends to the set top box belonging to the subscriber messages required to provide the authorization information (i.e., information necessary to descramble the scrambled instance) for the purchased premium service or event. If the authorization information indicates that the subscriber is entitled to watch the program of a scrambled instance, the set top box descrambles the scrambled instance to produce the program for viewing by the subscriber.

One drawback associated with this method is that the descrambling hardware is typically built into the set top box. The additional hardware adds cost to the set top box as well as to the system as a whole. Moreover, the additional hardware typically requires highly trained labor to keep the CATV system operational.

Additionally, typical CATV systems include an RF reverse path, which allows for the purchase of programs through the set top box at the time that the event is broadcast (i.e., impulse purchase of pay-per-view programs). In the absence of an RF reverse path, however, an alternate method is needed to allow for impulse purchasing of pay-per-view programs, or various other types of conditional access. This may be done via a phone line or other wireless connection. However, phone lines or wireless connections, and associated components, add to the complexity and cost of a system.

There is, therefore, a need in the industry for a simple and cost-effective method to accommodate impulse purchasing of pay-per-view programs, or various other types of conditional access.

SUMMARY OF THE INVENTION

A system and method are provided for controlling subscriber access to premium services in a conditional access system (e.g., a CATV system). Briefly described, the system includes, in one embodiment, an access device comprising a non-volatile memory having authorization information, a counter having a predetermined count, and a microprocessor configured to receive the authorization information from the memory. The microprocessor is further configured to receive an entitlement control message from a scrambled instance at an encryption period associated with the scrambled instance, and produce a control word from the authorization information and the entitlement control message at each encryption period. The microprocessor is further configured to decrement the counter at each encryption period in response to the generation of the control word.

The invention can also be seen as encompassing a method for descrambling a scrambled instance having contiguous scrambled sections. The method comprises the steps of descrambling a scrambled instance comprising contiguous scrambled sections, each section having an encryption period proportional to a predetermined encryption cycle rate, and decrementing a counter in response to the descrambling of each scrambled section.

Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWING

FIG. 3D is a more detailed flow chart showing the descrambling of the scrambled instance at the set top terminal;

DETAILED DESCRIPTION OF A PREFERRED EMBODIMENT

Figure 1A:
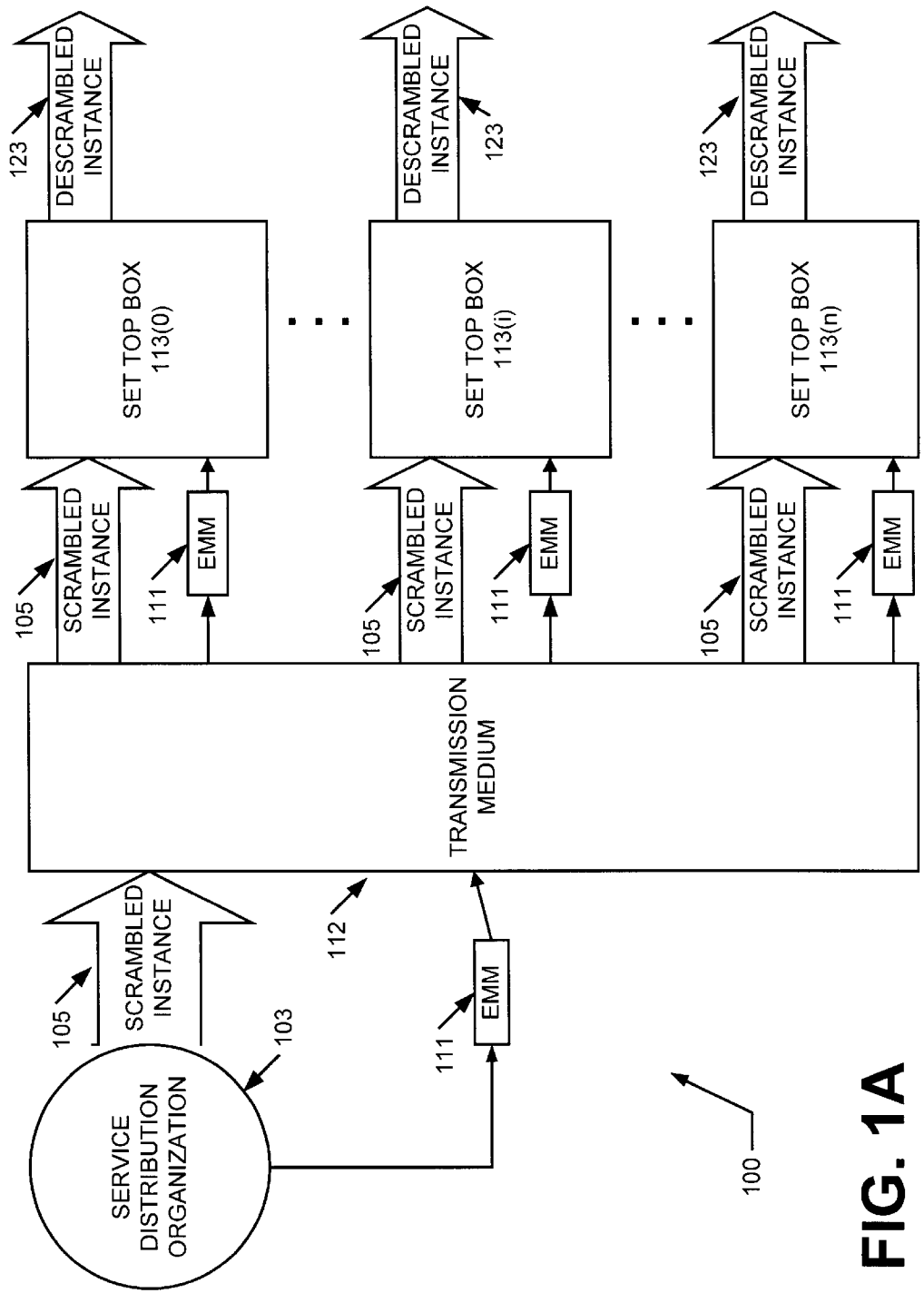
FIG. 1A is a diagram showing a typical conditional access system.

FIG. 1A provides an overview of a system 100 for limiting access to broadcast information. Such systems will be termed "conditional access systems." A service distribution organization 103, for example a CATV company or a satellite television company, provides its subscribers with information from a number of services, that is, collections of certain kinds of information. For example, the History Channel is a service that provides television programs about history. Each program provided by the History Channel is an "instance" of that service, which may be transported in either an analog or digital format. When the service distribution organization broadcasts an instance of the service, it may scramble the instance to form a scrambled instance 105. The scrambled instance 105 is broadcast over a transmission medium 112, which may be wireless or it may be "wired" (i.e., provided via a wire, a coaxial cable, or a fiber optic cable). An entitlement management message 111 is transmitted prior to the transmission of the scrambled instance 105 through the transmission medium 112, which also carries many other signals and service instances. The entitlement management message 111 contains information on which services may be accessed by the viewer as well as the keys for decrypting entitlement control messages 107 (discussed below) within the scrambled instance 105. The scrambled instance 105 is received in a large number of set top boxes 113(0 . . . n), each of which is preferably attached to a receiving device (not shown), such as a television set or a video cassette recorder (VCR). It is a function of each set top box 113 to determine whether the scrambled instance 105 should be descrambled and, if so, to descramble it to produce a descrambled instance 123, which is delivered to the receiving device (not shown).

Figure 1B:
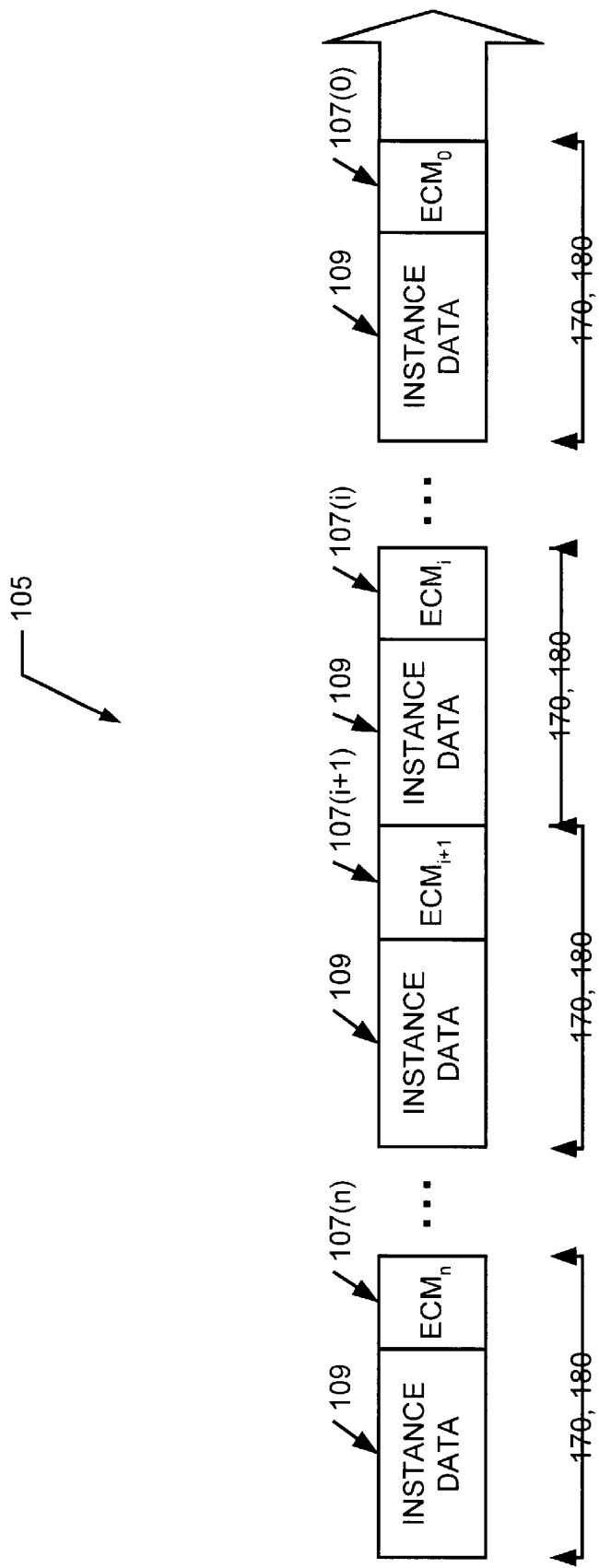
FIG. 1B is a diagram showing a scrambled instance.

FIG. 1B shows a scrambled instance 105 in more detail. The scrambled instance 105 contains instance data 109, which is the scrambled information making up the program, and entitlement control messages 107(0 . . . n). The entitlement control messages 107(0 . . . n) contain encrypted key information that is needed to descramble the scrambled portion of the associated instance data 109. Entitlement control messages 107(0 . . . n) may be sent multiple times per second, so that they may be quickly available to any new viewer of a service. In order to make descrambling of instance data 109 even more difficult for pirates, the descrambling key in the entitlement control messages 107(0 . . . n) may be changed frequently. The time period between the changes in entitlement control messages 107(0 . . . n) is referred to as the encryption period 170, and conversely, the rate at which the entitlement control messages 107(0 . . . n) change is referred to as the encryption cycle rate. Each scrambled instance 105 comprises contiguous scrambled sections 180 having an entitlement control message 107(i) for each scrambled section 180. If the information being scrambled is highly sensitive (i.e., very valuable information), the entitlement control messages 107(0 . . . n) are typically changed more frequently than for less sensitive information. Thus, typically, the encryption cycle rate for valuable information is inherently higher than the encryption cycle rate for less valuable information. The embodiment, as illustrated in FIG. 1B, shows a different entitlement control message 107(0 . . . n) for each scrambled section 180, thus, illustrating the highest encryption cycle rate available. However, as mentioned above, the entitlement control message may be changed less frequently by the service distribution organization for less sensitive information and, therefore, the encryption period 170 need not coincide with the scrambled section 180.

Figure 1C:
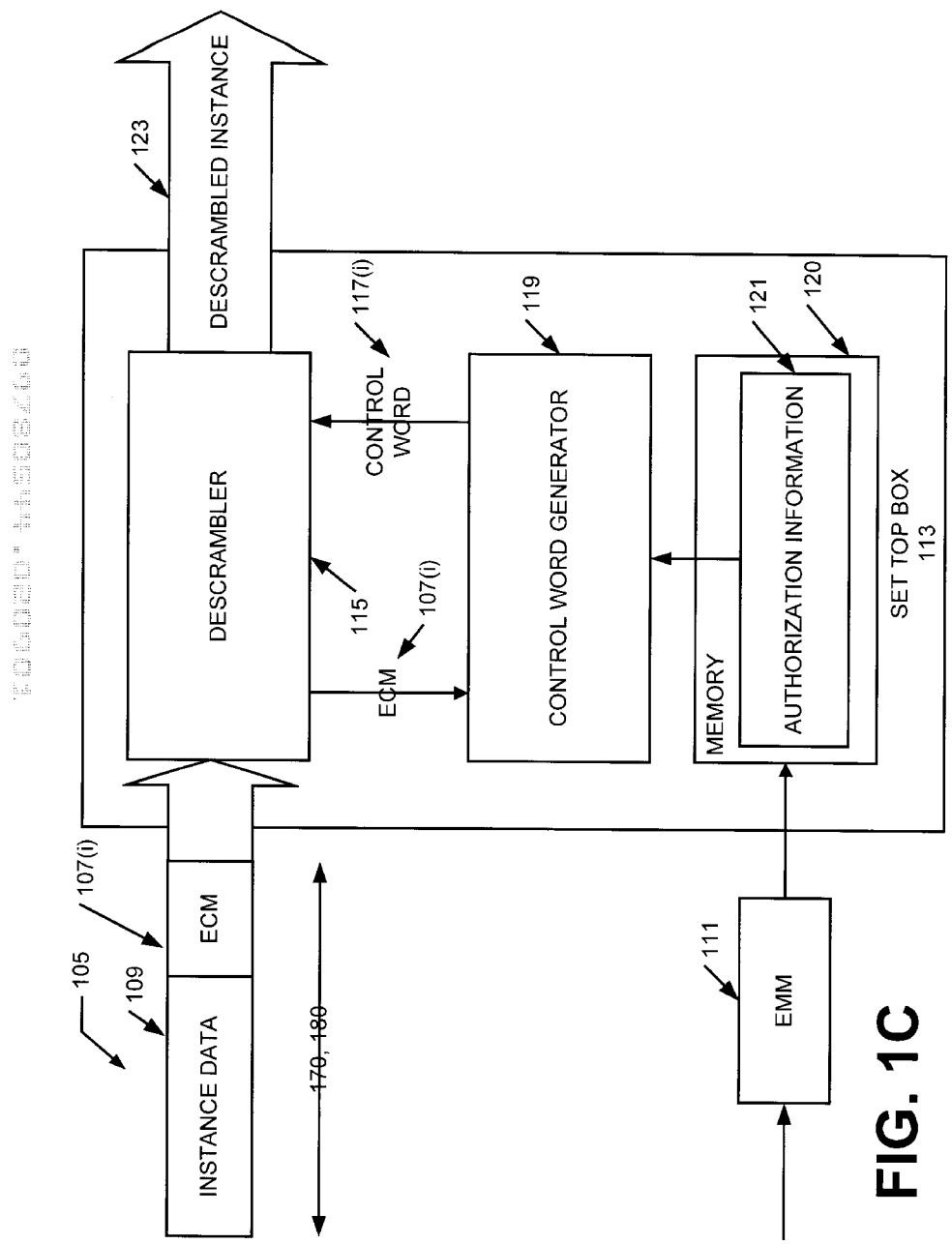
FIG. 1C is a more detailed diagram showing a set top box in a typical conditional access system configured to descramble a scrambled instance.

As shown in detail in FIG. 1C, the set top box 113 includes a descrambler 115, which uses a control word 117(i) as a key to descramble the scrambled instance 105. The control word 117(i) is produced by a control word generator 119 from information contained in the entitlement control message 107(i) and information from authorization information 121 stored in memory in the set top box 113. Of course, the set top box 113, like other functional devices discussed below, is understood to include various other elements for implementing the described functions, including, among other elements, a processor and memory for configuring the processor and being used by the processor for storing and processing various types of data. For example, the authorization information 121 may include a key for the service, an indication of what programs in the service the subscriber is entitled to watch, and information for decrypting the entitlement control message 107(i). If the authorization information 121 indicates that the subscriber is entitled to watch the program contained in the scrambled instance 105, the control word generator 119 uses the key together with information from the entitlement control message 107(i) to generate the control word 117(i). Of course, a new control word is generated for each different entitlement control message 107(i). The authorization information used in a particular set top box 113 is obtained from one or more entitlement management messages 111 addressed to that set top box 113 by the service distribution organization 103 (FIG. 1A). Subscribers may purchase services by the month, or they may purchase services such as pay-per-view events. In either case, after a subscriber has purchased a service, the service distribution organization 103 sends one or more entitlement management messages 111 to the set top box 113 of the subscriber. The entitlement management message(s) 111 provide authorization information 121 for the purchased services. Although the current example shows a separate channel (e.g., an out-of-band radio-frequency wired link) for sending entitlement management message(s) 111, the entitlement management message(s) 111 may be sent interleaved with instance data 109 in the same fashion as entitlement control messages 107(i) to the set top box 113. The set top box 113 stores the information from the entitlement management message(s) 111 in memory as authorization information 121. An example scrambling technique for an example conditional access system is discussed in detail in U.S. patent application Ser. No. 09/126,888, ENCRYPTION DEVICES FOR USE IN A CONDITIONAL ACCESS SYSTEM, and is hereby fully incorporated by reference in this application.

As can be seen from FIG. 1C, the control word generator 119, the authorization information 121, and other hardware associated with the reception of the entitlement management message 111 adds to the complexity and cost of such a system. Moreover, a typical conditional access system 100 (FIG. 1A) comprises a reverse path (not shown) for relaying information from the set top box 113 back to the service distribution organization 103 (FIG. 1A). This reverse path (not shown) allows the viewer to purchase pay-per-view programs by notifying the service distribution organization 103 (FIG. 1A). The purchase is reported to the service distribution organization 103 (FIG. 1A) at some time so that the viewer may be billed appropriately. The complexity of the system adds to the cost of maintaining such a system. As will be shown, the descrambling method and system in an embodiment of the invention takes advantage of the inherent differences in the encryption cycle rate (see FIG. 1B) associated with the value of scrambled instances 105, hence, allowing for control over subscriber access to sensitive information without complicated set top boxes 113(0 . . . n) (FIG. 1A) associated with the typical conditional access system 100 (FIG. 1A). As shown below, removal of several components from the set top box 113, as well as the removal of the reverse path (not shown) associated with typical conditional access systems 100 (FIG. 1A), would reduce the complexity of the system 100 (FIG. 1A), and consequently, the cost of maintenance associated with such a system 100 (FIG. 1A).

Figure 2A:
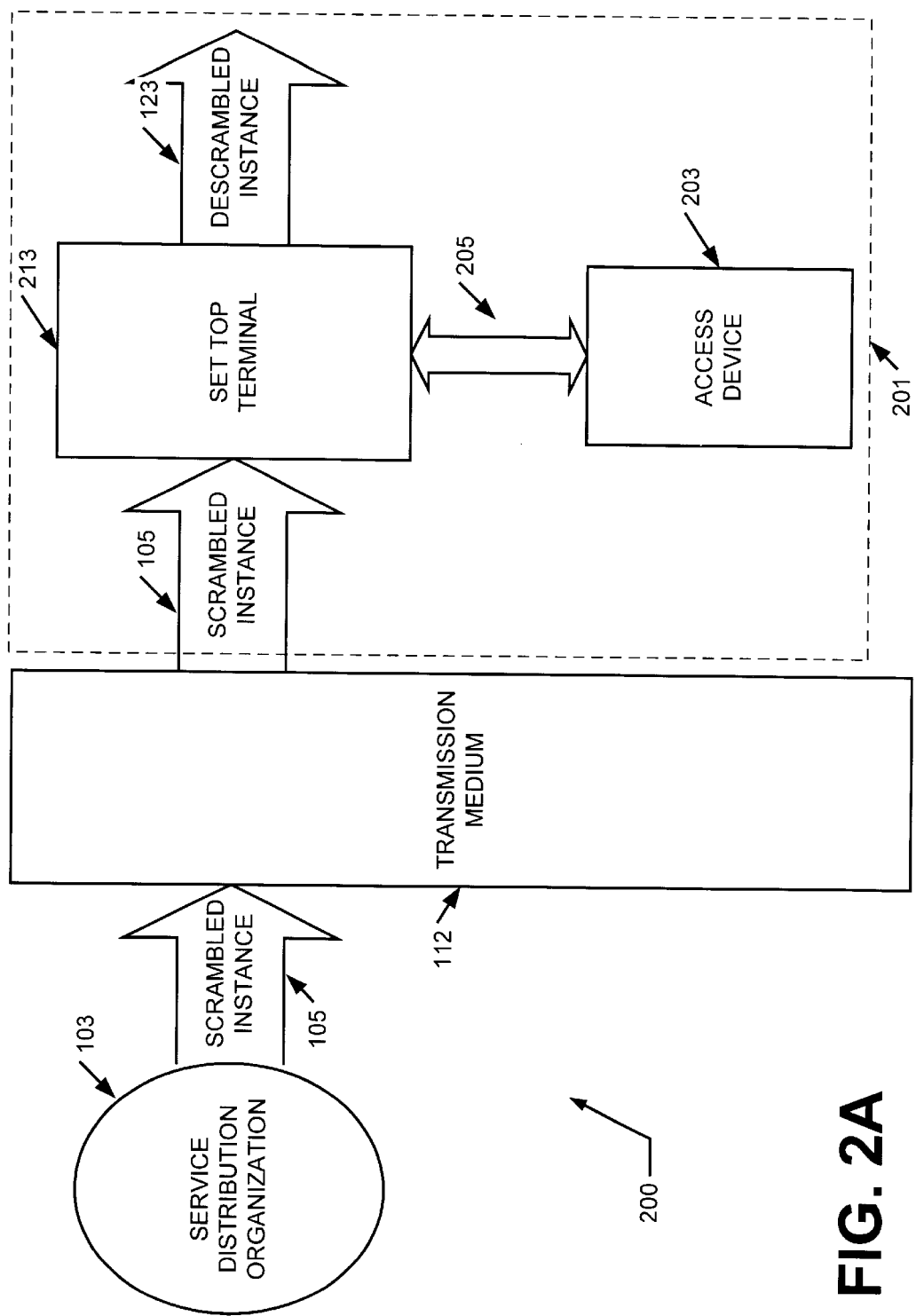
FIG. 2A is a diagram showing a conditional access system of an embodiment of the invention comprising an access device.

System Configured to Descramble a Scrambled Instance Using the Encryption Cycle Rate Inherent to the Scrambled Instance FIG. 2A is a diagram showing a conditional access system in an embodiment of the invention 200 comprising a descrambling system 201 having an access device 203. Similar to the conditional access system 100 of FIG. 1A, a service distribution organization 103 broadcasts an a scrambled instance 105 over a transmission medium 112, which may be wireless or it may be "wired" (i.e., provided via a wire, a coaxial cable, a fiber optic cable, or any other transmission non-wireless transmission medium). The scrambled instance 105 is received at a set top terminal 213, each of which is attached to a television set (not shown). Although only one set top terminal 213 is shown, the scrambled instance 105 may be transmitted to a number of different set top terminals and, hence, to a number of different viewers (not shown). The set top terminal 213 is configured to interface with an access device 203 through an interface 205. It is a function of both the set top terminal 213 and the access device 203 to determine whether the scrambled instance 105 should be descrambled and, if so, to decrypt the entitlement control message 107(i) (FIG. 1B) to produce control information for descrambling the scrambled instance 105 to produce the descrambled instance 123, which is delivered to the television set (not shown).

Figure 2B:
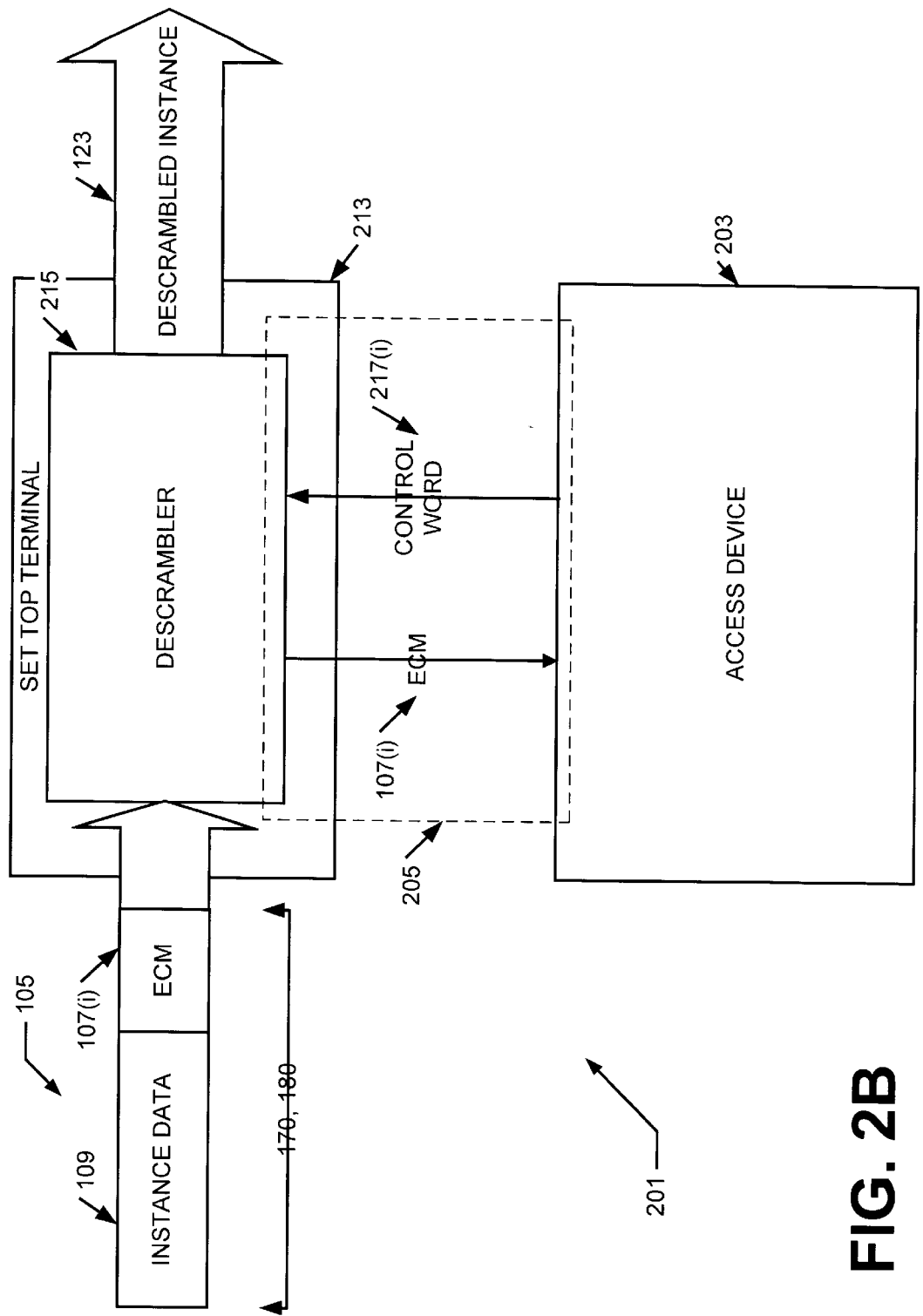
FIG. 2B is a more detailed diagram showing the descrambling system having an access device configured to decrypt the ECM of a scrambled instance.

FIG. 2B is a more detailed diagram showing the descrambling system 201 having an access device 203 configured to descramble a scrambled instance 105. Each contiguous section 180 of the scrambled instance 105 is received at a descrambler 215 located in the set top terminal 213. The descrambler 215 is configured to extract the entitlement control message 107(i) of the scrambled instance 105 at each encryption period 170. The entitlement control message 107(i) is transmitted from the descrambler 215 to the access device 203 through an interface 205. The access device 203 uses the entitlement control message 107(i) to generate a unique control word 217(i), which corresponds to the entitlement control message 107(i). Since each entitlement control message 107(i) produces a unique control word 217(i), a control word is generated each time the entitlement control message 107(i) changes. The control word 217(i) is then transmitted by the access device 203 to the descrambler 215 through the interface 205. The descrambler 215 then takes the control word 217(i) and descrambles the scrambled instance data 109 from the scrambled instance 105 to generate a descrambled instance 123, which is then transmitted to a television set (not shown). The details of an example descrambling technique are further discussed in detail in the U.S. patent application incorporated by reference above. Unlike the set top box 113 (FIGS. 1A and 1C) of the typical conditional access system 100 (FIG. 1A), the set top terminal 213 in this embodiment 200 does not contain the control word generator 119 (FIG. 1C) or the authorization information 121 (FIG. 1C). Rather, the necessary hardware and software for generating the control word 117(i) is located on the access device 203 separate from the set top terminal 213, thus, making for a simpler set top terminal 213 configuration as compared to the complicated set top box 113 configuration of the typical conditional access system 100 (FIG. 1A). This simplification of the set top terminal 213 allows for reduction in cost of production and, also, reduction in cost of maintenance and associated infrastructure. Moreover, since the hardware and software are contained on the access device 203, systems without a reverse channel are accommodated.

Figure 2C:
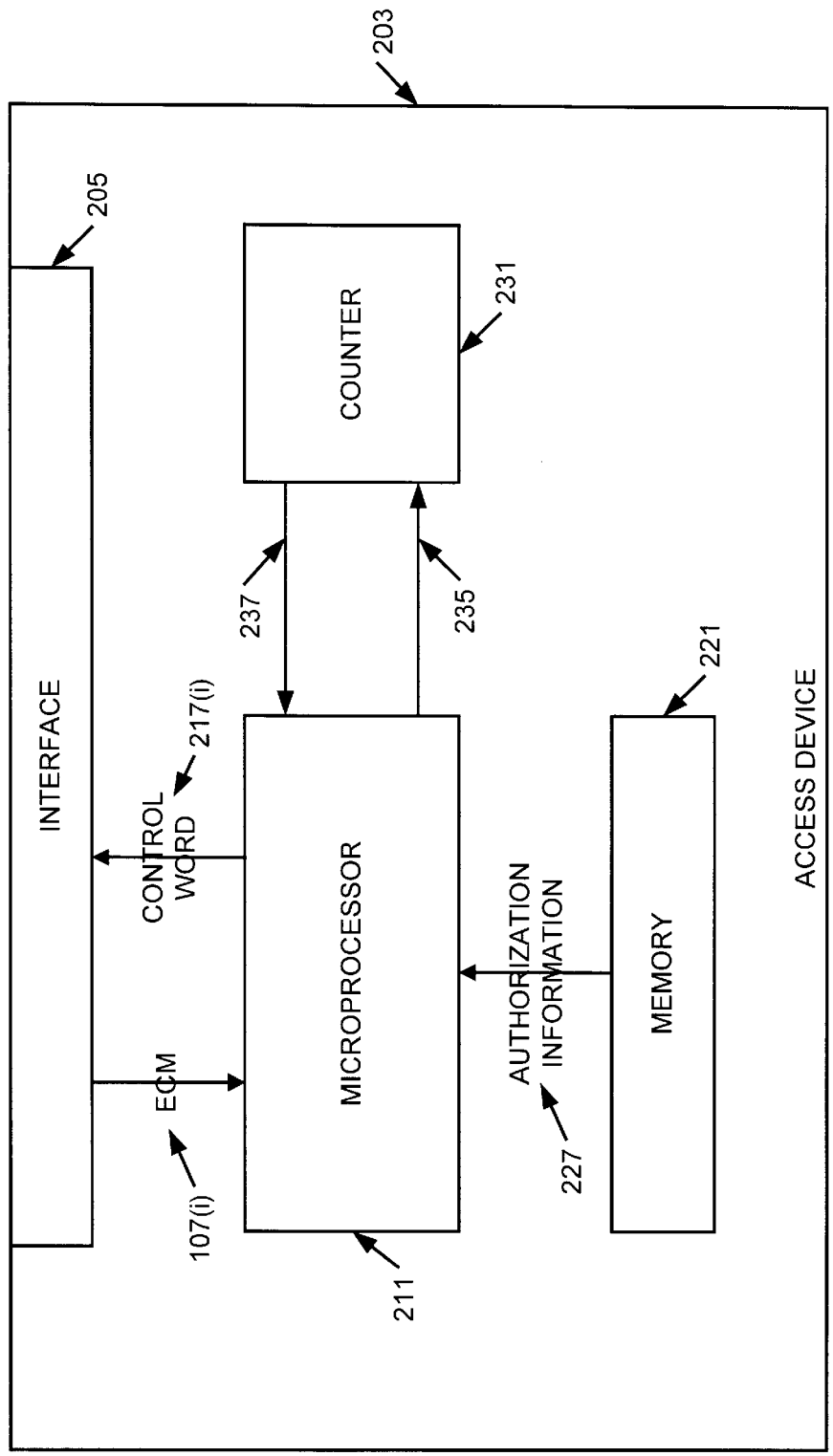
FIG. 2C is a diagram showing the details of the access device.

FIG. 2C is a block diagram showing the details of a preferred embodiment of the access device 203. In a preferred embodiment, the access device 203 would be a smart card configured to interface with the set top terminal 213 (FIG. 2B) to allow for descrambling of the scrambled instance 105 (FIG. 2B). The access device 203 is configured to interface with the set top terminal 213 (FIG. 2B) through an interface 205. The interface 205 may be, but is not limited to, electrical contacts, which provide a connection between the access device 203 and the set top terminal 213 (FIG. 2B). This interface 205 allows for transmission of the entitlement control message 107(i) from the set top terminal 213 (FIG. 2B) to the access device 203 as well as transmission of the control word 217(i) from the access device 203 to the set top terminal 213 (FIG. 2B). The access device 203 comprises a memory 221 having authorization information 227, a counter 231, and a microprocessor 211. The microprocessor 211 receives the authorization information 227 from the memory 221 and the entitlement control message 107(i) from the set top terminal 213 (FIG. 2B) through the interface 205. The microprocessor 211 then checks the counter 231 to see whether the counter 231 is depleted and, if the counter 231 is not depleted, the microprocessor 211 uses the authorization information 227 to generate the control word 217(i) from the entitlement control message 107(i). After the generation of the control word 217(i), the microprocessor 211 sends a decrement command 235 to the counter 231 to decrement the counter 231 for each unique control word 217(i) generated. Since the count of the counter 231 is dependent on the generation of each unique control word 217(i) from the entitlement control message 107(i), and since the time period between each unique entitlement control message 107(i) is defined by an encryption period 170, the counter 231 becomes depleted at a rate proportional to the encryption cycle rate. As mentioned earlier, more valuable information is typically scrambled at a higher encryption cycle rate, and hence, the descrambling of more valuable information would decrement the counter 231 at a faster rate than the descrambling of less valuable information. Since the system 200 is an encryption cycle rate-based system, rather than a time-based or money-based system, the depletion of the counter 231 would be independent of time or money and only dependent on the value of the information as determined by the encryption cycle rate.

Moreover, since the access device 203 contains the authorization information 227 in memory 221, there is no need to transmit an additional entitlement management message 111 (FIG. 1A) having authorization information 227 to the set top terminal 213 (FIG. 2A). It is also evident that the reverse path associated with a typical conditional access system 100 (FIG. 1A) is no longer required since, here, the subscriber having an access device 203 (e.g., smart card) would automatically have access to the program as long as the counter 231 on the smart card was not depleted. This system, therefore, has advantages over previous systems in that the requisite hardware for conditional access systems is much simpler, thus, leading to a reduction in the cost of production and a concomitant reduction in the cost of maintenance.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled. For example, it will be clear to one of ordinary skill in the art that the present system, although described as a hardware configuration of a conditional access system, may be implemented through software (e.g., the counter may be implemented in hardware or software).

Method of Descrambling a Scrambled Instance Using the Encryption Cycle Rate Inherent to the Scrambled Instance The invention may also be seen as encompassing a process for descrambling a scrambled instance associated with a predetermined encryption cycle rate.

Figure 3A:
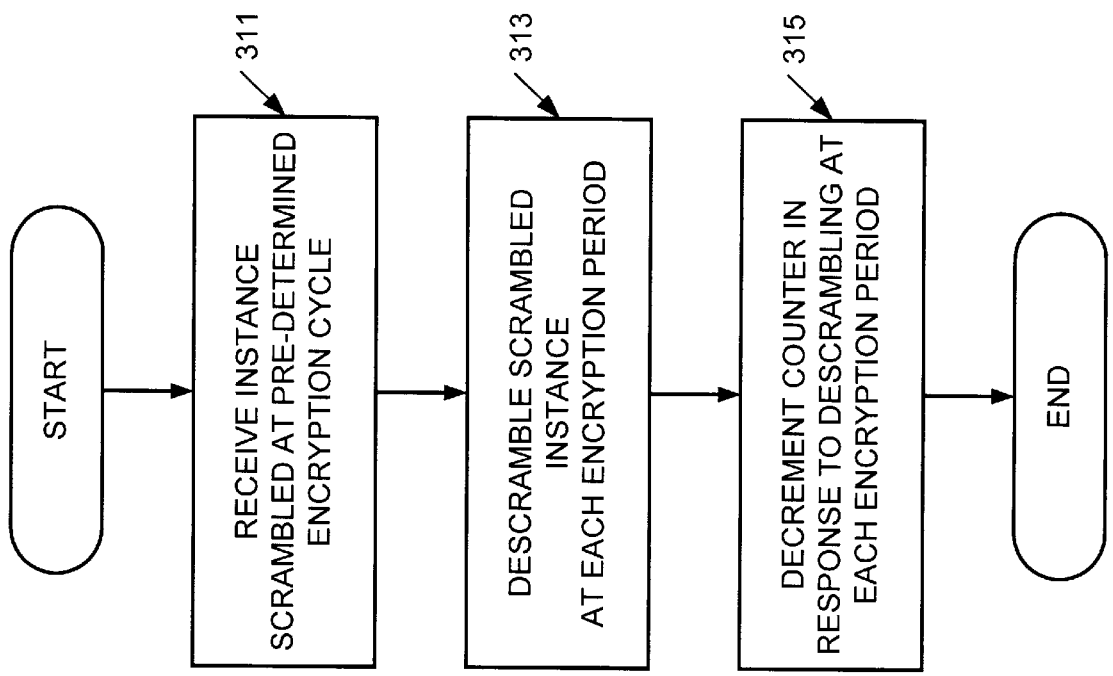
FIG. 3A is a flow chart showing the descrambling method in an embodiment of the invention.

FIG. 3A is a flow chart showing, in general, the steps performed by the system 200 (FIG. 2A) for descrambling an instance scrambled at a predetermined encryption cycle rate (see FIG. 1B). This method can be broadly conceptualized as receiving, in step 311, a scrambled instance 105 (FIG. 2B) scrambled at a pre-determined encryption cycle rate (see FIG. 1B); descrambling, in step 313, the scrambled instance 105 (FIG. 2B) at each encryption period; and upon descrambling of the instance at each encryption period, decrementing, in step 315, a counter 231 (FIG. 2C) in response to the descrambling of the instance at each encryption period 170 (FIG. 1B). The encryption cycle rate is the rate at which the entitlement control message changes, and is determined at the service distribution organization. Thus, the set top terminal need not determine the encryption cycle rate because the counter merely decrements in response to changing entitlement control messages (i.e., in response to the encryption cycle rate). Since the method is an encryption cycle rate-based method, rather than a time-based or money-based method, the depletion of the counter 231 (FIG. 2C) would be independent of time or money and only dependent on the value of the information as determined by the encryption cycle rate. This method, therefore, eliminates exchange rate problems that may normally be associated with a time-based or money-based system of typical conditional access systems. Moreover, since the decrementing 315 of the counter 231 (FIG. 2C) is determined by the encryption cycle rate, this allows for a pro rata method of tracking the viewing of premium services, which is normally not available in a typical event-based conditional access system 100 (FIG. 1A).

Figure 3B:
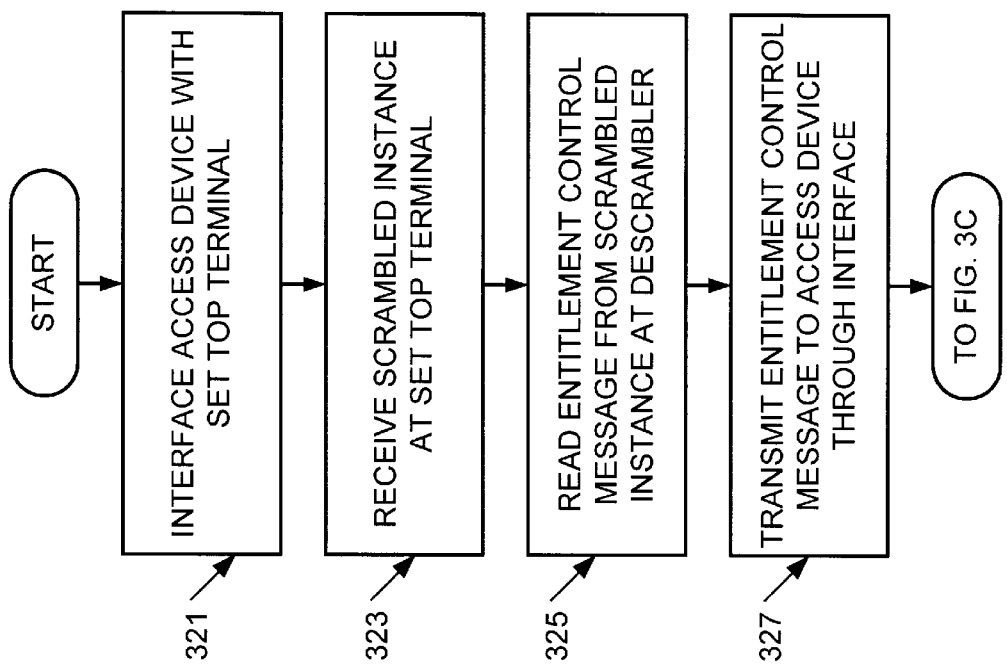
FIG. 3B is a more detailed flow chart showing the reading of an entitlement control message from the scrambled instance at the set top terminal.
Figure 3C:
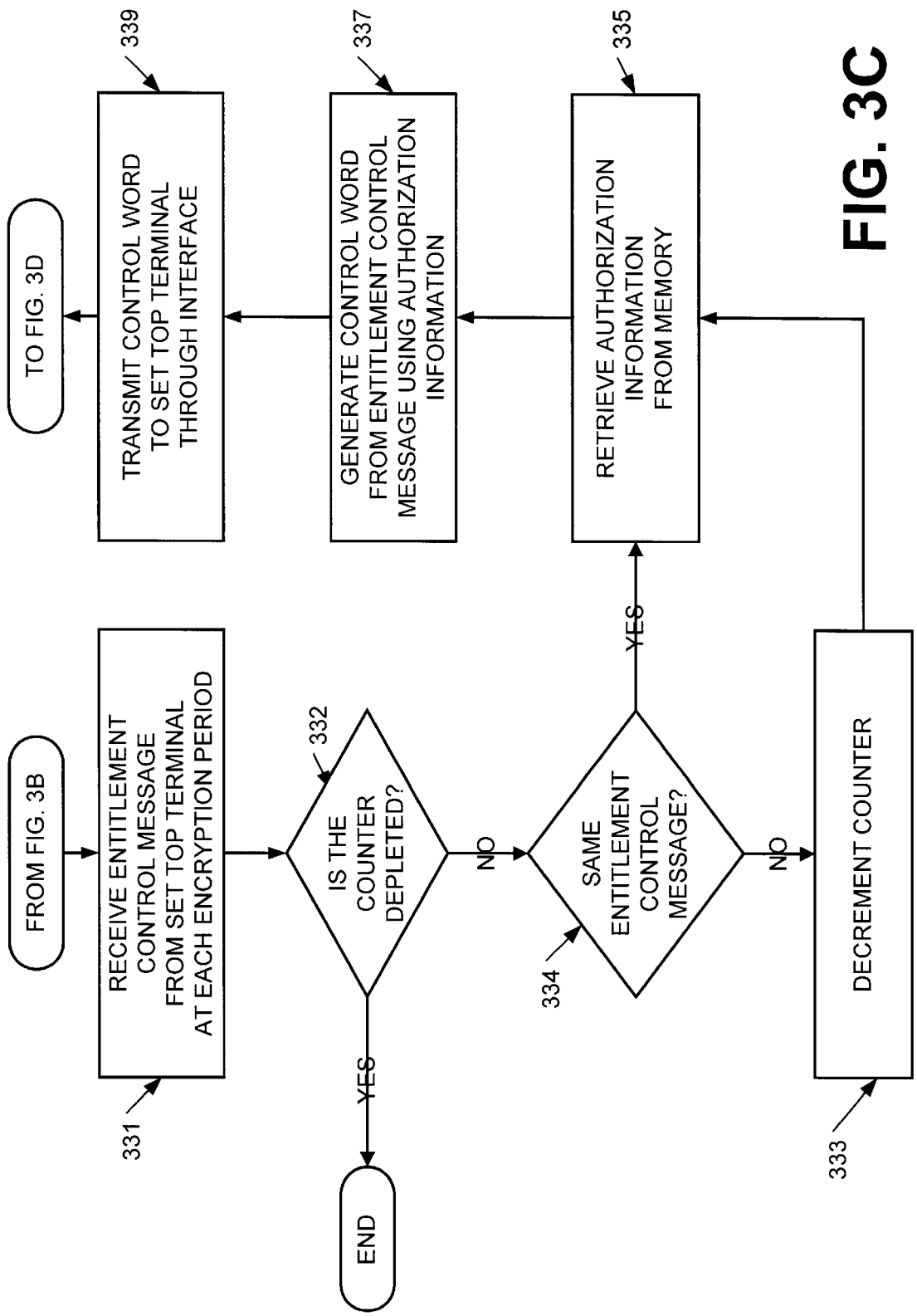
FIG. 3C is a more detailed flow chart showing the generation of a control word at the access device.

FIGS. 3B, 3C, and 3D show the method of FIG. 3A in greater detail. FIG. 3B is a more detailed flow chart showing the reading of an entitlement control message 107($i$) (FIG. 2B) from the scrambled instance 105 (FIG. 2B) at the set top terminal 213 (FIG. 2B). The access device 203 (FIG. 2B) would interface, in step 321, with the set top terminal 213 (FIG. 2B). The set top terminal 213 (FIG. 2B) then receives, in step 323, a scrambled instance 105 (FIG. 2B). The entitlement control message 107($i$) (FIG. 2B) is then read, in step 325, from the scrambled instance 105 (FIG. 2B) at the descrambler 215 (FIG. 2B) of the set top terminal 213 (FIG. 2B). This entitlement control message 107($i$) (FIG. 2B) is then transmitted, in step 327, to the access device 203 (FIG. 2C) through the interface 205 (FIG. 2B).

FIG. 3C is a more detailed flow chart showing the generation of a control word 217($i$) (FIG. 2C) from the entitlement control message 107($i$) (FIG. 2B) transmitted to the access device 203 (FIG. 2C) in step 327 (FIG. 3B). The microprocessor 211 (FIG. 2C) of the access device 203 (FIG. 2C) receives, in step 331, the entitlement control message 107($i$) (FIG. 2C) from the set top terminal 213 (FIG. 2B). The microprocessor 211 (FIG. 2C) then determines, in step 332, whether the counter 231 (FIG. 2C) is depleted. If the counter 231 (FIG. 2C) is depleted, then the microprocessor 211 (FIG. 2C) ends the process. If the counter 231 (FIG. 2C) is not depleted, the microprocessor 211 (FIG. 2C) further determines, in step 334, whether the entitlement control message 107($i$) (FIG. 2C) has changed. If the entitlement control message 107($i$) (FIG. 2C) has changed, then the microprocessor 211 (FIG. 2C) decrements, in step 333, the counter 231 (FIG. 2C) in response to the changed entitlement control message 107($i$) (FIG. 2C). After decrementing the counter 231 (FIG. 2C) in step 333, the microprocessor 211 (FIG. 2C) retrieves, in step 335 the authorization information 227 (FIG. 2C) from memory 221 (FIG. 2C). If, however, the microprocessor 211 (FIG. 2C) determines, in step 334, that the entitlement control message 107($i$) (FIG. 2C) has not changed, then the microprocessor 211 (FIG. 2C) retrieves 335 the authorization information 227 (FIG. 2C) without decrementing the counter 231 (FIG. 2C). After retrieving 335 the authorization information 227 (FIG. 2C), the microprocessor 211 (FIG. 2C) then generates, in step 337, the control word 217($i$) (FIG. 2C) from the entitlement control message 107($i$) (FIG. 2C) using the authorization information 227 (FIG. 2C). Upon generating 337 the control word 217($i$) (FIG. 2C), the microprocessor 211 (FIG. 2C) transmits, in step 339, the control word 217($i$) (FIG. 2C) to the set top terminal 213 (FIG. 2B) through the interface 205 (FIG. 2C).

FIG. 3D is a more detailed flow chart showing the descrambling of the scrambled instance 105 (FIG. 2B) at the set top terminal 213 (FIG. 2B) after the transmission 339 (FIG. 3C) of the control word 217($i$) (FIG. 2C) from the access device 203 (FIG. 2C). The descrambler 215 (FIG. 2B) of the set top terminal 213 (FIG. 2B) receives, in step 341, the control word 217($i$) (FIG. 2B) from the access device 203 (FIG. 2B) through the interface 205 (FIG. 2B). Using this control word 217($i$) (FIG. 2B), the descrambler 215 (FIG. 2B) then descrambles, in step 343, the scrambled instance 105 (FIG. 2B) to produce a descrambled instance 123 (FIG. 2B). This descrambled instance 123 (FIG. 2B) is transmitted, in step 345, to a television set (not shown) for viewing by the subscriber. After the transmission of the descrambled instance 123 (FIG. 2B) to the viewer's television set, the descrambler receives, step 323 (FIG. 3B), the next section of the scrambled instance 105 (FIG. 2B) having the appropriate key, and the process repeats itself.

Although the method is shown with sequential steps, it will be clear to one of ordinary skill in the art that several of the steps may be performed out of order without effect to the described method. For example, although the preferred embodiment shows the decrementing 337 of the counter after the generation 335 of the control word, the decrementing 337 may be done before the retrieval 333 of the authorization information from memory without effect on the described descrambling process. Similarly, other steps, such as the determining step 332, the retrieval step 333, and the generating step 335, may be performed out of order, and in many different permutations, without deviating from the spirit and scope of the invention. The foregoing description, therefore, has been presented for purposes of illustration and description, and is not intended to be exhaustive or to limit the invention to the precise forms disclosed.

Figure 4A:
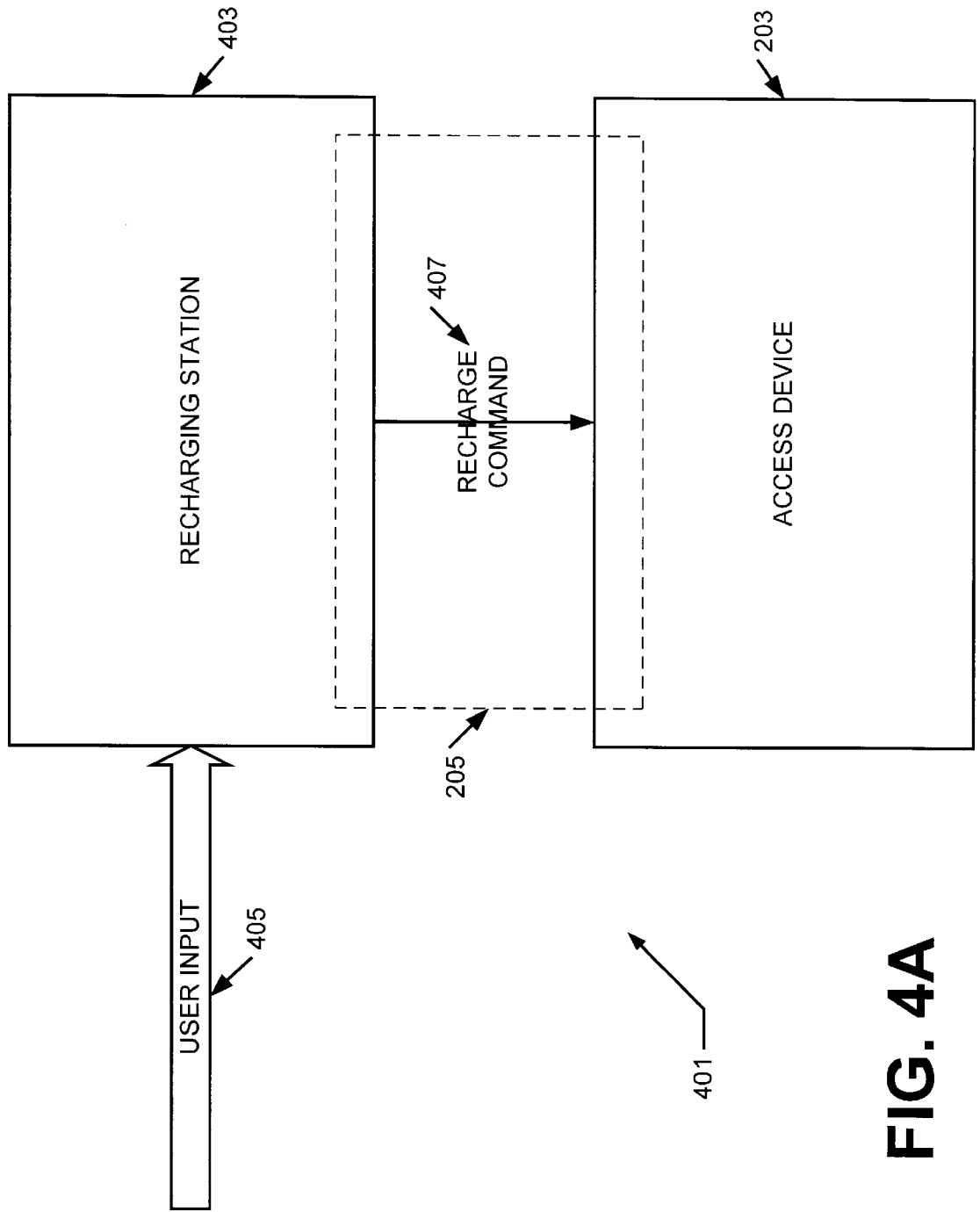
FIG. 4A is a diagram showing the system for recharging the access card.
Figure 4B:
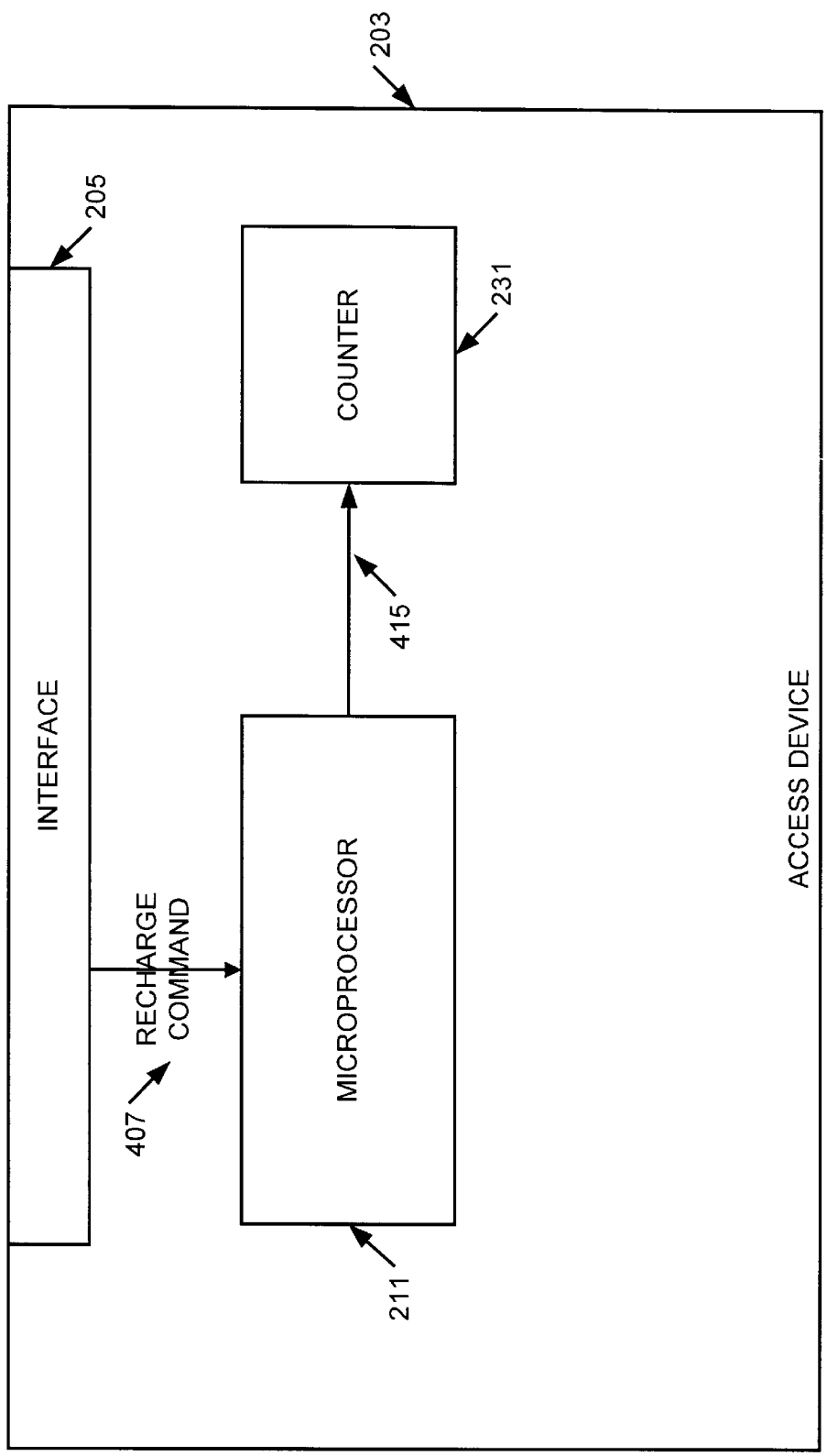
FIG. 4B is a more detailed diagram showing the access device configured to increment the counter.

System Configured to Recharge the Access Device and Increment the Counter Associated with the Descrambling System As shown in the system and method for descrambling a scrambled instance (FIGS. 2A–2C; FIGS. 3A–3D), after a given number of encryption periods 170 (FIG. 1B), it is possible for the counter 231 (FIG. 2C) of the access device 203 to become depleted (i.e., the counter reaches a zero count). In such an instance, it would be advantageous to replenish (or recharge) the counter 231 (FIG. 2C) and reuse the access device 203 rather than dispose of the access device 203. FIGS. 4A and 4B show an example system for recharging the access device.

FIG. 4A is a diagram showing the system 401 for recharging the access card 203. The access device 203 would interface with the recharging station 403 via an interface 205. This interface 205 may be the same as that used to interface the access device 203 with the set top terminal 213 (FIG. 2B), or it may be a separate interface. In the preferred embodiment, the interface 205 serves the dual purpose of interfacing with the set top terminal 213 (FIG. 2B) as well as interfacing with the recharging station 403. Once the access device 203 interfaces with the recharging station 403, a recharge command 407 is sent from the recharging station 403 to the access device 203 in response to a user input 405. Typically, the user input 405 would be money, a credit card, or other possible methods of payment. The recharging station 403 would convert the user input 405 into a recharge command 407 having information relating to the count. This recharge command 407 replenishes the access device 203 for further use with the set top terminal 213 (FIG. 2B) in one embodiment of invention 200 (FIG. 2A).

FIG. 4B is a more detailed diagram showing the access device 203 configured to increment the counter 231. The microprocessor 211 of the access device 203 receives the recharge command 407 having information relating to the count. The microprocessor 211 then sends a count increment 415 to the counter 231 using the count information from the recharge command 407. Once the counter 231 has been incremented, it is now ready to descramble the scrambled instances 105 (FIG. 2B).

Figure 5A:
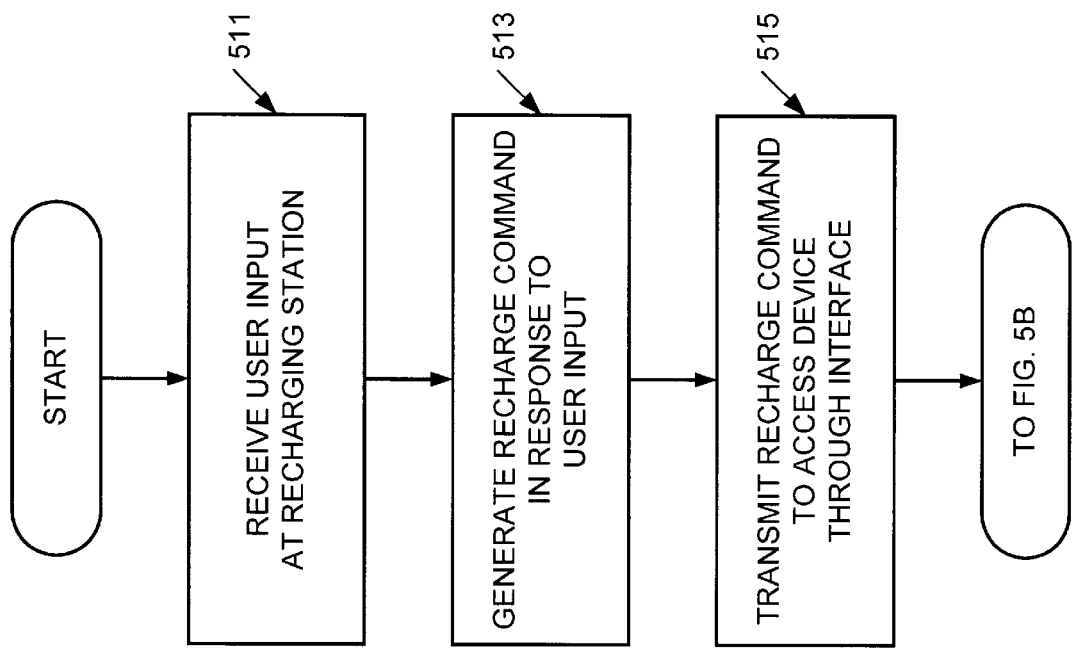
FIG. 5A is a flow chart showing the method of generating a recharge command at a recharging station.
Figure 5B:
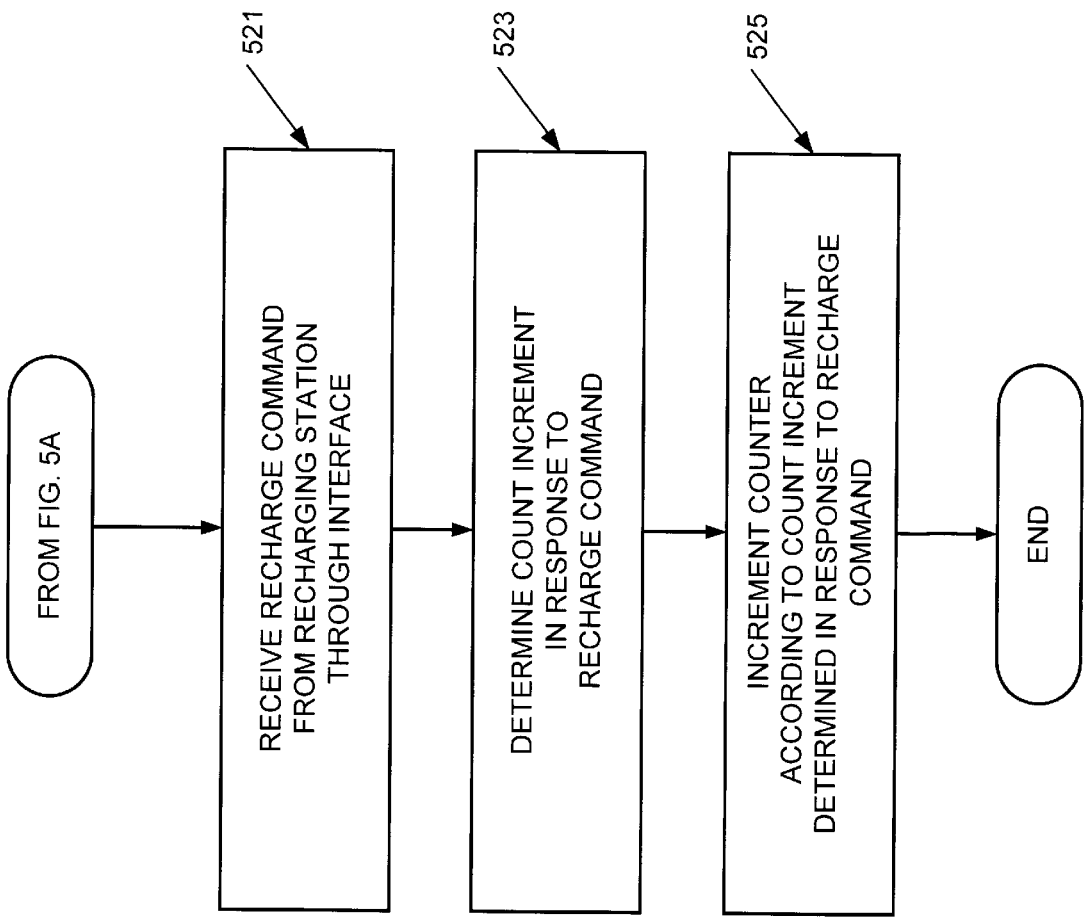
FIG. 5B is a flow chart showing the method of incrementing the counter in response to a recharge command.

Method for Recharging the Access Device and Incrementing the Counter Associated with the Descrambling Method FIGS. 5A and 5B are flow charts showing the method of generating a recharge command 407 (FIG. 4A) at a recharging station 403 (FIG. 4A) and incrementing a counter 231 (FIG. 4B) in an access device 203 (FIG. 4B).

The recharging station 403 (FIG. 4A) receives, in step 511, a user input 405 (FIG. 4A). In response to the user input 405 (FIG. 4A), the recharging station 403 (FIG. 4A) generates, in step 513, a recharge command 407 (FIG. 4A). This recharge command 407 (FIG. 4A) is then transmitted, in step 515, to the access device 203 (FIG. 4A) through an interface 205 (FIG. 4A). The microprocessor 211 (FIG. 4B) of the access device 203 (FIG. 4B) receives, in step 521, the recharge command 407 (FIG. 4B) from the recharging station 403 (FIG. 4A) through the interface 205 (FIG. 4B). The microprocessor 211 (FIG. 4B) then determines, in step 523, the count increment 415 (FIG. 4B) in response to the recharge command 407 (FIG. 4B). The count increment 415 (FIG. 4B) is then used to increment, in step 525, the counter 231 (FIG. 4B). In a preferred embodiment, the interface 205 (FIG. 4A) of the recharging station 403 (FIG. 4A) and the access device 203 (FIG. 4A) are encrypted to prevent fraudulent recharging. In that embodiment, a unique signature is generated to allow verification by the access device of the recharging operation. A possible way of accomplishing the secure interface is by implementing a public key encryption and common signature generation method.

Since many systems and methods of incrementing counters are known in the art, and since the method of incrementing the counter in the access device is not the inventive element here, further issues relating to the incrementing of counters will not be discussed.

The Detailed Description of a Preferred Embodiment set forth above is to be regarded as exemplary and not restrictive, and the breadth of the invention disclosed herein is to be determined from the claims as interpreted with the full breadth permitted by the patent.

What is claimed is:

1. A system for controlling subscriber access to premium services in cable television systems comprising:

a service distribution organization configured to produce a scrambled instance from instance data, the scrambled instance comprising contiguous scrambled sections having the instance data and entitlement control messages, the service distribution organization further configured to change the entitlement control messages at a predetermined encryption period, the service distribution organization further configured to transmit the scrambled instance;

an access device comprising a non-volatile memory having authorization information, the access device further comprising a counter having a predetermined count, the access device further comprising a microprocessor configured to receive authorization information from the non-volatile memory, the microprocessor further configured to receive the entitlement control message from the scrambled instance, the microprocessor further configured to generate a control word from the entitlement control message using the authorization information and transmit the control word, the microprocessor further configured to decrement the counter at each encryption period in response to changes in the entitlement control message; and a set top terminal comprising a receiver configured to receive the scrambled instance from the service distribution organization, the set top terminal further comprising a descrambler configured to provide the entitlement control message of the scrambled instance to the access device, the descrambler further configured to receive the control word from the access device, the descrambler further configured to descramble the scrambled instance at each encryption period using the control word to produce a descrambled instance, the set top terminal further comprising a transmitter configured to transmit the descrambled instance to a television set.

2. In a system for controlling subscriber access to premium services in a cable television systems, an access device comprising:

a non-volatile memory having authorization information;

a counter having a predetermined count; and a microprocessor configured to receive the authorization information from the non-volatile memory, the microprocessor further configured to receive an entitlement control message from a scrambled instance at an encryption period associated with the scrambled instance, the microprocessor further configured to determine changes in the entitlement control message, the microprocessor further configured to decrement the counter in response to changes in the entitlement control message, the microprocessor further configured to produce a control word from the entitlement control message at each encryption period using the authorization information.

3. The access device of claim 2, further configured to removably interface with a set top terminal.

4. The access device of claim 2, wherein the microprocessor is further configured to disable the generation of the control word in response to a depletion of counts in the counter.

5. The access device of claim 4, further comprising an interface configured to interface the access device with a set top terminal.

6. The access device of claim 5, wherein the interface is configured to allow transmission of the entitlement control message from the set top terminal to the access device.

7. The access device of claim 5, wherein the interface is further configured to allow transmission of the control word from the access device to the set top terminal.

8. The access device of claim 4, wherein the interface is further configured to interface the access device with a recharging station, the recharging station configured to produce a recharge command, the recharge command configured to increment the counter.

9. In a system for controlling subscriber access to premium services in a cable television system, an accessing means comprising:

a storage means for storing authorization information;

a counting means for counting; and a processing means for generating a control word for descrambling a scrambled instance, the processing means further for decrementing the counter in response to the generation of the control word.

10. The accessing means of claim 9, further comprising an interfacing means for interfacing the accessing means to a set top terminal.

11. The accessing means of claim 10, the interfacing means further for allowing access to the descrambling means by the set top terminal.

12. The accessing means of claim 11, further comprising a disabling means for disabling the generation of the control word in response to a predetermined count of the counter.

13. The accessing means of claim 10, the interfacing means further for interfacing the accessing means with a recharging station, the recharging station for producing a recharge command, the recharge command for incrementing the counter.

14. A method for controlling subscriber access to premium services in cable television systems, comprising the steps of:

interfacing an access device with a set top terminal;

receiving a scrambled instance having instance data and at least one entitlement control message, each scrambled instance comprising contiguous scrambled sections, each section being part of an encryption period proportional to a predetermined encryption cycle rate;

reading the entitlement control message from the scrambled instance at each encryption period;

determining a count from a counter;

determining changes in the entitlement control message in response to the count from the counter;

decrementing the counter in response to changes in the entitlement control message;

retrieving authorization information in response to the count from the counter;

generating a control word from the entitlement control message using the authorization information; and descrambling the scrambled instance using the control word at each encryption period to produce a descrambled instance.

15. A method for controlling subscriber access to premium services in cable television systems, comprising the steps of:

descrambling a scrambled instance comprising contiguous scrambled sections encrypted at a predetermined encryption cycle rate; and decrementing a counter at the encryption cycle rate.

16. The method of claim 15, wherein the step of descrambling further comprises:

receiving a scrambled instance having instance data and at least one entitlement control message, each scrambled instance comprising contiguous scrambled sections, each section being part of an encryption period proportional to a predetermined encryption cycle rate;

reading the entitlement control message from the scrambled instance;

determining a count;

determining changes in the entitlement control message in response to the count;

retrieving authorization information in response to the count;

generating a control word from the entitlement control message using the authorization information; and using the control word to descramble the scrambled instance at each encryption period to produce a descrambled instance.

17. The method of claim 16, wherein the step of decrementing the counter is responsive to changes in the entitlement control message.

18. The method of claim 15, wherein the encryption period is the duration of the scrambled section.

19. The method of claim 15, further comprising the step of disabling the generation of the control word in response to a predetermined count on the counter.

20. The method of claim 19, further comprising the step of incrementing the counter in response to a recharge command from a recharging station.

* * * * *